United States Patent
Lin

(10) Patent No.: US 11,122,548 B2
(45) Date of Patent: Sep. 14, 2021

(54) DEVICE-TO-DEVICE COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 88 days.

(21) Appl. No.: 16/706,275

(22) Filed: Dec. 6, 2019

(65) Prior Publication Data

US 2020/0112949 A1   Apr. 9, 2020

Related U.S. Application Data

(63) Continuation of application No. PCT/CN2017/096858, filed on Aug. 10, 2017.

(51) Int. Cl.
*H04W 72/04* (2009.01)
*H04W 4/40* (2018.01)
*H04W 76/14* (2018.01)

(52) U.S. Cl.
CPC ......... *H04W 72/0406* (2013.01); *H04W 4/40* (2018.02); *H04W 76/14* (2018.02); *H04W 72/0446* (2013.01)

(58) Field of Classification Search
CPC .... H04W 76/14; H04W 4/40; H04W 72/0406
See application file for complete search history.

(56) References Cited

U.S. PATENT DOCUMENTS

| 10,736,088 B2* | 8/2020 | Ryu ................... H04W 72/042 |
| 2016/0219641 A1 | 7/2016 | Chae et al. |

(Continued)

FOREIGN PATENT DOCUMENTS

| CN | 105515721 A | 4/2016 |
| CN | 105873218 A | 8/2016 |

(Continued)

OTHER PUBLICATIONS

Intel Corporation Considerations on Support of Short TTI for LTE V2V Side-link Communication 3GPP TSG RAN WG1 Meeting #89, R1-1707307, May 19, 2017.

(Continued)

*Primary Examiner* — Raj Jain
(74) *Attorney, Agent, or Firm* — Ladas & Parry LLP

(57) ABSTRACT

The present disclosure provides a D2D communication method, including: a first terminal device receives a control channel transmitted by a second terminal device on a first transmission time interval TTI, where the control channel includes a specific bit, and the specific bit is used to indicate a length of time domain used by the second terminal device for transmitting a data channel; the first terminal device senses the data channel transmitted by the second terminal device based on the first TTI if a value on the specific bit indicates that the length of time domain is equal to a length of the first TTI; and the first terminal device senses the data channel transmitted by the second terminal device based on a second TTI if the value on the specific bit indicates that the length of time domain is equal to a length of the second TTI.

16 Claims, 6 Drawing Sheets

(56) References Cited

U.S. PATENT DOCUMENTS

| | | | |
|---|---|---|---|
| 2017/0019886 A1 | 1/2017 | Patel et al. | |
| 2017/0142704 A1 | 5/2017 | Jung et al. | |
| 2018/0242276 A1* | 8/2018 | Patel | H04W 68/025 |
| 2018/0359745 A1 | 12/2018 | Yeo et al. | |
| 2019/0208504 A1* | 7/2019 | Yasukawa | H04W 24/10 |
| 2020/0112949 A1* | 4/2020 | Lin | H04W 76/14 |
| 2020/0245270 A1* | 7/2020 | Harada | H04L 1/0026 |
| 2020/0314803 A1* | 10/2020 | Zhang | H04W 74/006 |

FOREIGN PATENT DOCUMENTS

| | | |
|---|---|---|
| CN | 106028454 A | 10/2016 |
| CN | 106538022 A | 3/2017 |
| CN | 106961732 A | 7/2017 |
| KR | 20160118905 A | 10/2016 |
| WO | 2017126266 A1 | 7/2017 |

OTHER PUBLICATIONS

The EESR of corresponding European application No. 17921315.2, dated Mar. 17, 2020.

ZTE et al: "Discussion on Short TTI with eV2X", 3GPP Draft; R1-1704655-7.2.3.3 Discussion on Short TII With V2X, 3rd Generation Partnership Project (3GPP), Mobile Competence Centre; 650, Route Des Lucioles; F-06921 Sophia-Antipolis Cedex; Fran, vol. RAN WGI, No. Spokane, Washington, USA; Apr. 3, 2017-Apr. 7, 2017 Mar. 24, 2017(Mar. 24, 2017), XP051250551.

Ericsson:"Short TTI transmission for PC5-based V2X", 3GPP Draft; R1-1708969 STTI Overview—Ericsson, 3rd Generation Partnership Project (3GPP), Mobile Competence Centre; 650, Route Des Lucioles; F-06921 Sophia-Antipolis Cedex; France, vol. RAN WGI, No. Hangzhou, China; May 15, 2017-May 19, 2017 May 6, 2017(May 6, 2017), XP051262793.

Nokia et al: "Further Discussion on Short TTI", 3GPP Draft; R1-1708560—Nokia_Further_Discussion_On_Short_TTI, 3rd Generation Partnership Project (3GPP), Mobile Competence Centre; 650, Route Des Lucioles, F-06921 Sophia-Antipolis Cedex; France, vol. RAN WG1, No. Hangzhou; May 15, 2017-May 19, 2017 May 14, 2017(May 14, 2017), XP051273752.

The First Office Action of corresponding Chinese application No. 201780090904.X, dated Jun. 8, 2020.

The first Office Action of corresponding Chilean application No. 201903320, dated Feb. 17, 2021.

The first Office Action of corresponding Indian application No. 201917050228, dated Mar. 30, 2021.

* cited by examiner

```
┌─────────────────────────────────────────┐
│ A second terminal device transmits a control channel to a │
│ first terminal device based on a first transmission time  │
│ interval TTI, where the control channel includes a specific│
│ bit, and the specific bit is used to indicate that a length of│
│ time domain used by the second terminal device for        │~ 610
│ transmitting a data channel is a length of a second TTI, and│
│ the length of the second TTI is smaller than a length of the│
│ first TTI                                                  │
└─────────────────────────────────────────┘
                        │
┌─────────────────────────────────────────┐
│ The second terminal device transmits the data channel to  │
│ the first terminal device based on the second TTI, so that│
│ the first terminal device determines, according to a value│
│ on the specific bit, that the length of time domain used by│~ 620
│ the second terminal device for transmitting the data      │
│ channel is the length of the second TTI, and senses the   │
│ data channel transmitted by the second terminal device    │
│ based on the second TTI                                   │
└─────────────────────────────────────────┘
```

FIG. 6

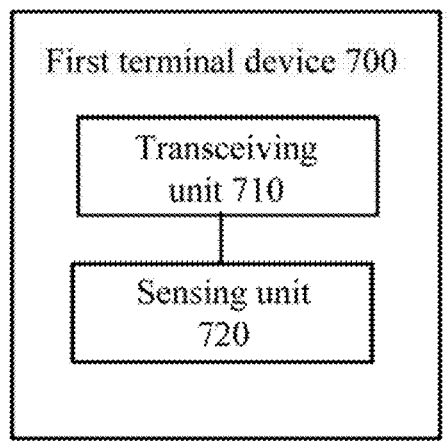

FIG. 7

DEVICE-TO-DEVICE COMMUNICATION METHOD AND TERMINAL DEVICE

CROSS-REFERENCE TO RELATED APPLICATIONS

This application is a continuation of the International Application No. PCT/CN2017/096858, filed on Aug. 10, 2017, entitled "DEVICE-TO-DEVICE (D2D) COMMUNICATION METHOD AND TERMINAL DEVICE", the content of which is incorporated herein by reference in its entirety.

TECHNICAL FIELD

Embodiments of the present disclosure relate to the field of wireless communications, and in particular, to a device to device (D2D) communication method and a terminal device.

BACKGROUND

A vehicle to everything or vehicle to device (V2X) communication system is a sidelink (SL) transmission technology based on D2D communication. Being different from an approach used in a traditional long term evolution (LTE) system, where data is received or transmitted via a base station, the V2X system uses an approach that a terminal communicates with another terminal directly, thereby having a higher spectrum efficiency and a lower transmission delay.

In a V2X system, a terminal indicates a data channel resource for transmitting a data channel through a control channel, performs data transmission on a corresponding data channel resource, and transmits a control channel corresponding to the data channel on a control channel resource corresponding to the data channel resource. In the 3rd Generation Partnership Project (3GPP) Release-14, a terminal performs control channel transmission and data channel transmission based on a transmission time interval (TTI), where the data channel and its corresponding control channel are transmitted in the same TTI. However, for a terminal of new Release-15, a control channel and a data channel can be transmitted in a short TTI (sTTI) to reduce delay. In order to enable the terminal of Release-14 to detect the control channel transmitted by the terminal of Release-15, the terminal of Release-15 can transmit two types of control channel simultaneously, where one is a control channel based on TTI transmission (which can be called a normal control channel), the other is a control channel based on sTTI transmission (which can be called a short control channel).

However, if the one detected by a terminal of Release-15 is a normal control channel, the terminal of Release-15 cannot determine whether the normal control channel is a control channel transmitted by a terminal of Release-15 or a control channel transmitted by a terminal of Release-14, and thus cannot determine whether to perform TTI-based or sTTI-based resource sensing.

SUMMARY

The embodiments of the present disclosure provide a D2D communication method and a terminal device. The terminal device can perform resource sensing effectively according to a detected control channel.

In a first aspect, a D2D communication method is provided, including: receiving, by a first terminal device, a control channel transmitted by a second terminal device on a first transmission time interval TTI, where the control channel includes a specific bit, and the specific bit is used to indicate a length of time domain used by the second terminal device for transmitting a data channel; sensing, by the first terminal device, the data channel transmitted by the second terminal device based on the first TTI if a value on the specific bit indicates that the length of time domain is equal to a length of the first TTI; and sensing, by the first terminal device, the data channel transmitted by the second terminal device based on a second TTI if the value on the specific bit indicates that the length of time domain is equal to a length of the second TTI, where the length of the second TTI is smaller than the length of the first TTI.

Therefore, the first terminal device determines, by using information indicated by the specific bit in a detected control channel, resource occupancy of the data channel corresponding to the control channel, so that the first terminal device can perform resource sensing effectively according to the detected control channel.

In a possible implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

In a possible implementation, the plurality of second TTIs have a same length or different lengths.

In a possible implementation, the length of the second TTI is equal to one time slot.

In a possible implementation, the control channel carries sidelink control information SCI, and the specific bit includes a reserved bit included in the SCI.

In a possible implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

In a second aspect, a D2D communication method is provided, including: transmitting, by a second terminal device, a control channel to a first terminal device based on a first transmission time interval TTI, where the control channel includes a specific bit, and the specific bit is used to indicate that a length of time domain used by the second terminal device for transmitting a data channel is a length of a second TTI, and the length of the second TTI is smaller than a length of the first III; and transmitting, by the second terminal device, the data channel to the first terminal device based on the second TTI, so that the first terminal device determines, according to a value on the specific bit, that the length of time domain used by the second terminal device for transmitting the data channel is the length of the second and senses the data channel transmitted by the second terminal device based on the second TTI.

Therefore, the second terminal device indicates, by setting a specific bit of a control channel to be transmitted, resource occupancy of the data channel corresponding to the control channel, so that the first terminal device that detects the control channel can perform resource sensing effectively according to the detected control channel.

In a possible implementation, the second terminal device determines that the length of time domain for transmitting the data channel is the length of the second TTI; and the second terminal device sets the value on the specific bit to a value corresponding to the length of the second TTI according to the length of the second TTI.

In a possible implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

In a possible implementation, the plurality of second TTIs have a same length or different lengths.

In a possible implementation, the length of the second TTI is equal to one time slot.

In a possible implementation, the control channel carries sidelink control information SCI, and the specific bit includes a reserved bit included in the SCI.

In a possible implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

In a third aspect, a terminal device is provided, and the terminal device can perform operations of the first terminal device in the foregoing first aspect or any optional implementation of the first aspect. In particular, the terminal device may include a modular unit for performing the operations of the first terminal device in the first aspect or any of the possible implementations of the first aspect described above.

In a fourth aspect, a terminal device is provided, and the terminal device can perform operations of the second terminal device in the foregoing second aspect or any optional implementation of the second aspect. In particular, the terminal device may include a modular unit for performing the operations of the second terminal device in the second aspect or any of the possible implementations of the second aspect described above.

In a fifth aspect, a terminal device is provided, the terminal device includes a processor, a transceiver, and a memory. The processor, the transceiver, and the memory communicate with each other via an internal connection path. The memory is configured to store instructions, the processor is configured to execute the instructions stored in the memory. When the processor executes the instructions stored in the memory, the execution causes the terminal device to perform the method according to the first aspect or any of the possible implementations of the first aspect, or causes the terminal device to implement a terminal device provided by the third aspect.

In a sixth aspect, a terminal device is provided, the terminal device includes a processor, a transceiver, and a memory. The processor, the transceiver, and the memory communicate with each other via an internal connection path. The memory is configured to store instructions, the processor is configured to execute the instructions stored in the memory. When the processor executes the instructions stored in the memory, the execution causes the terminal device to perform the method according to the second aspect or any of the possible implementations of the second aspect, or causes the terminal device to implement a terminal device provided by the fourth aspect.

In a seventh aspect, a computer readable storage medium is provided, the computer readable storage medium stores a program, where the program causes a terminal device to perform the first aspect described above, and any one of the D2D communication methods in its various implementations.

In an eighth aspect, a computer readable storage medium is provided, the computer readable storage medium stores a program, where the program causes a terminal device to perform the second aspect described above, and any one of the D2D communication methods in its various implementations.

In a ninth aspect, a system chip is provided, the system chip includes an input interface, an output interface, a processor, and a memory, where the processor is configured to execute an instruction stored in the memory, when the instruction is executed, the processor can implement the foregoing method according to the first aspect or any of the possible implementations of the first aspect.

In a tenth aspect, a system chip is provided, the system chip includes an input interface, an output interface, a processor, and a memory, where the processor is configured to execute an instruction stored in the memory, when the instruction is executed, the processor can implement the foregoing method according to the second aspect or any of the possible implementations of the second aspect.

In an eleventh aspect, a computer program product including instructions is provided, when the computer program product is run on a computer, the computer is caused to execute the method according to the first aspect or any of the possible implementations of the first aspect.

In a twelfth aspect, a computer program product including instructions is provided, when the computer program product is run on a computer, the computer is caused to execute the method according to the second aspect or any of the possible implementations of the second aspect.

BRIEF DESCRIPTION OF DRAWINGS

FIG. 6 is a schematic flowchart of a D2D communication method according to an embodiment of the present disclosure.

FIG. 7 is a schematic block diagram of a first terminal device according to an embodiment of the present disclosure.

DESCRIPTION OF EMBODIMENTS

Technical solutions in the embodiments of the present disclosure are described below with reference to the accompanying drawings.

It should be understood that the technical solutions of the embodiments of the present disclosure can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), or a 5G system in future, etc.

The present disclosure describes various embodiments in connection with a terminal device. The terminal device may also refer to user equipment (UE), an access terminal, a subscriber unit, a subscriber station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a function of wireless communication, a computing device or other processing device connected to a wireless modem, an in-vehicle device, a wearable device, a terminal device in a future 5G network, or a terminal device in a future evolved public land mobile network (PLMN) networks, etc.

The present disclosure describes various embodiments in connection with a network device. The network device may be a device for communicating with a terminal device, for example, it may be a base transceiver station (BTS) in a GSM system or CDMA, or may be a NodeB (NB) in a WCDMA system, or ma be an evolutional Node B (eNB or eNodeB) in an LTE system, or the network device may be a relay station, an access point, an in-vehicle device, a wearable device, or a network side device in a future 5G network or a network side device in a future evolved PLMN network, etc.

Figure 1:
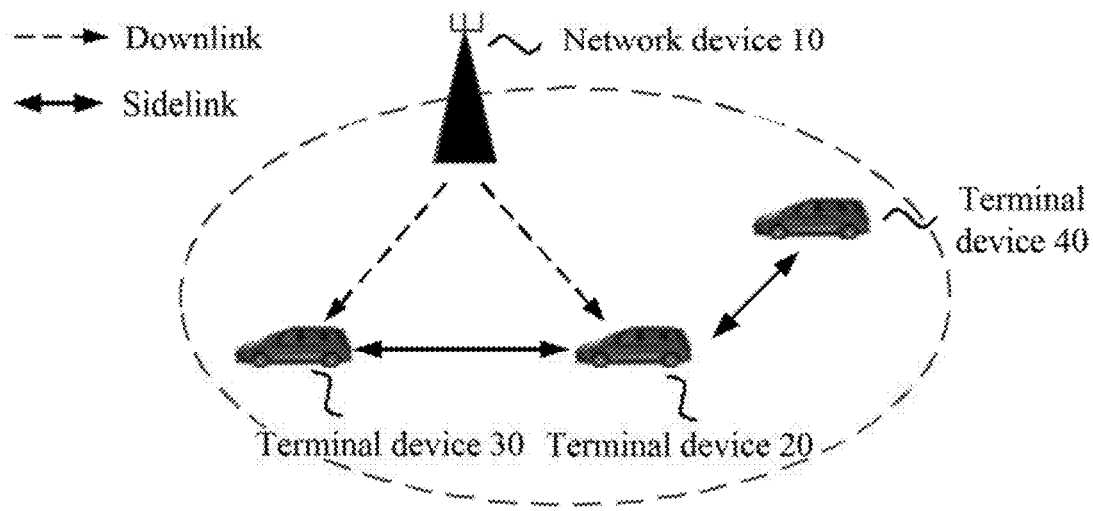
FIG. 1 is a schematic structural diagram of an application scenario according to an embodiment of the present disclosure.

FIG. 1 is a schematic diagram of an application scenario according to an embodiment of the present disclosure. FIG. 1 exemplarily shows a network device, that is, a network device 10, and three terminal devices, that is, a terminal device 20, a terminal device 30, and a terminal device 40. Alternatively, the wireless communication system may include a plurality of network devices, where some other number of terminal devices may be included in the coverage of each network device, which is not limited in the embodiment of the present disclosure. In addition, the wireless communication system may further include other network entities such as a mobile management entity (MME), a serving gateway (S-GW), and a packet data network gateway (P-GW). However, the embodiments of the disclosure are not limited thereto.

Specifically, the terminal device 20, the terminal device 30, and the terminal device 40 can communicate in a cellular communication mode or a D2D communication mode, where in the cellular communication mode, a terminal device communicates with other terminal devices through cellular links between the terminal devices and the network device; while in the D2D communication mode, two terminal devices communicate directly through a D2D link, that is, a sidelink (SL).

A D2D communication may refer to a vehicle to vehicle (V2V) communication or a vehicle to everything (V2X) communication. In V2X communication, X can refer to any device with wireless receiving and transmitting capabilities, such as, but not limited to, a slow moving wireless device, a fast moving in-vehicle device, or a network control node with wireless transmitting and receiving capabilities. It should be understood that the embodiments of the present disclosure are mainly applied to the scenario of V2X communication, but can also be applied to any other D2D communication scenarios, which is not limited in the embodiment of the present disclosure.

In a V2X system, the terminal device 20 can transmit sidelink control information (SCI). The SCI carries information related to data transmission of the terminal device 20, such as a modulation and coding scheme (MCS), information on time-frequency resource allocation, resource reservation information, and the like. The terminal device 30 or the terminal device 40 that detects the SCI can obtain a position of a time-frequency resource used by the terminal device 20 for data transmission, resource reservation information, and the like through the SCI, so as to determine a resource usage situation of the terminal device 20. If the terminal device 30 or the terminal device 40 cannot successfully detect such resource scheduling information, it may measure enemies on all the transmission resources, order all the transmission resources according to energy levels, and preferentially select a transmission resource with a low enemy for its own data transmission.

In Release-14 (Rel-14) of the 3GPP protocol, SCI is carried on a physical sideline control channel (PSCCH), and a format, for example a format 1, may be adopted for the SCI, where SCI format 1 includes control information corresponding to a physical sidelink shared channel (PSSCH), such as MCS, time-frequency resource indication information, priority information, resource reservation information, and retransmission indication information. And the SCI format 1 further includes reserved bits, in Release-14, values of all reserved bits of the SCI are set to zero.

It should be noted that the resource reservation information in the SCI is different from the reserved information bits of the SCI. The resource reservation information in the SCI generally includes 4 bits, which are used to indicate whether a terminal device reserves a corresponding transmission resource for subsequent data transmission. However, the reserved bits of the SCI are temporarily unused bits and are generally set to zero.

In Release-15 (Rel-15) of the 3GPP protocol, a short TTI (sTTI) is introduced, where a terminal device supporting Release-15 is required to use sTTI to transmit a data channel, and a terminal device supporting Release-15 and a terminal device supporting Release-14 (Rel-14) can perform data transmission using a common resource pool, which has a great impact on resource sensing and resource selecting process for the terminal device supporting Release-14. Therefore, it is necessary for the terminal device supporting Release-14 to be able to detect SCI transmitted by the terminal device of Release-15, such as resource scheduling information or scheduling, assignment (SA) information, to learn the resource occupancy of the terminal device of Release-15, so as to perform resource sensing and selecting. This requires the terminal device of Release-15 to be able to transmit a normal control channel which is compatible with Release-14. However, for the terminal device of new Release-15, a control channel and a data channel can be transmitted in the same sTTI to reduce delay, that is, the terminal device of Release-15 can transmit a short control channel on sTTI, for example, transmit short SA (sSA) information on the sTTI. The terminal device of Release-15 can obtain the content of said control channel by detecting the sSA, and determine a position of a data channel resource according to the sSA and perform a detection of the data channel without waiting for a TTI of 1 ms (i.e., normal TTI) to complete the detection of the control channel, thereby reducing delay.

Figure 2:
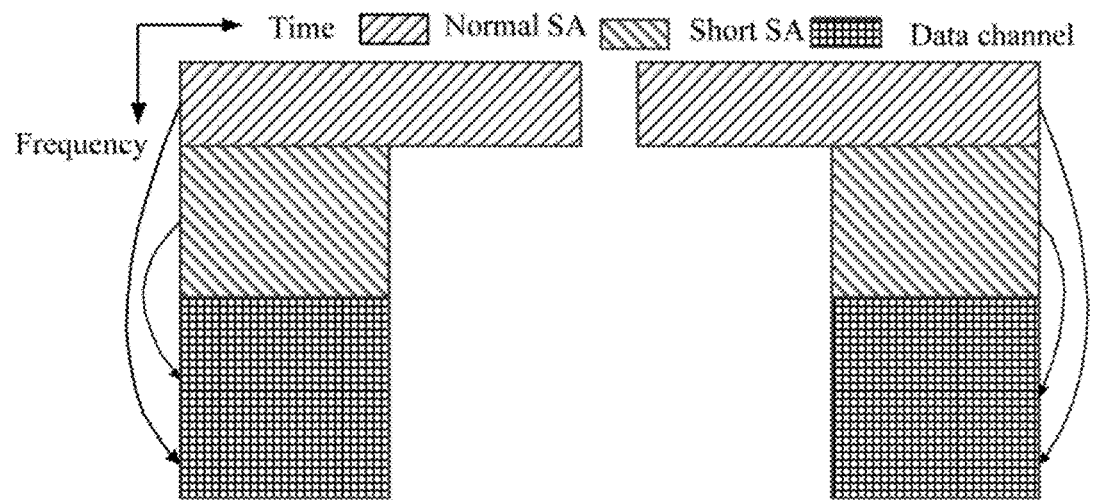
FIG. 2 is a schematic diagram of a resource used by a terminal device for transmitting a control channel and a data channel.

That is to say, on the one hand, the terminal device of Release-14 needs to detect a control channel transmitted by the terminal device of Release-15 to obtain the resource occupancy of the terminal device of Release-15, so as to perform resource sensing and selecting. On the other hand, a terminal device of Release-15 also needs to detect a control channel transmitted by a terminal device of Release-15 to obtain the resource occupancy of the terminal device of Release-15, so as to perform resource sensing and selection. Therefore, for example, resources used by the control channel and the data channel shown in FIG. 2, a terminal device of Release-15 needs to transmit a short SA and a data channel on an sTTI, and to transmit normal SA on a TTI.

Since a terminal device of Release-14 and a terminal device of Release-15 may present at the same time, if a terminal device of Release-15 detects a normal SA, it cannot recognize whether the SA is transmitted by a terminal device of Release-14 or by a terminal device of Release-15. If the SA is transmitted by a terminal device of Release-14, frequency domain resources indicated by the SA for transmitting a data channel are all occupied in one subframe; if the SA is transmitted by a terminal device of Release-15, then the terminal device that transmits the SA also transmits a short SA and transmits a data channel based on an sTTI, where the short SA and the data channel transmitted based on the sTTI only occupy part of resources in one subframe, therefore the terminal device that receives the SA needs to determine the resource usage of a specific data channel based on the content of the short SA.

Figure 3:
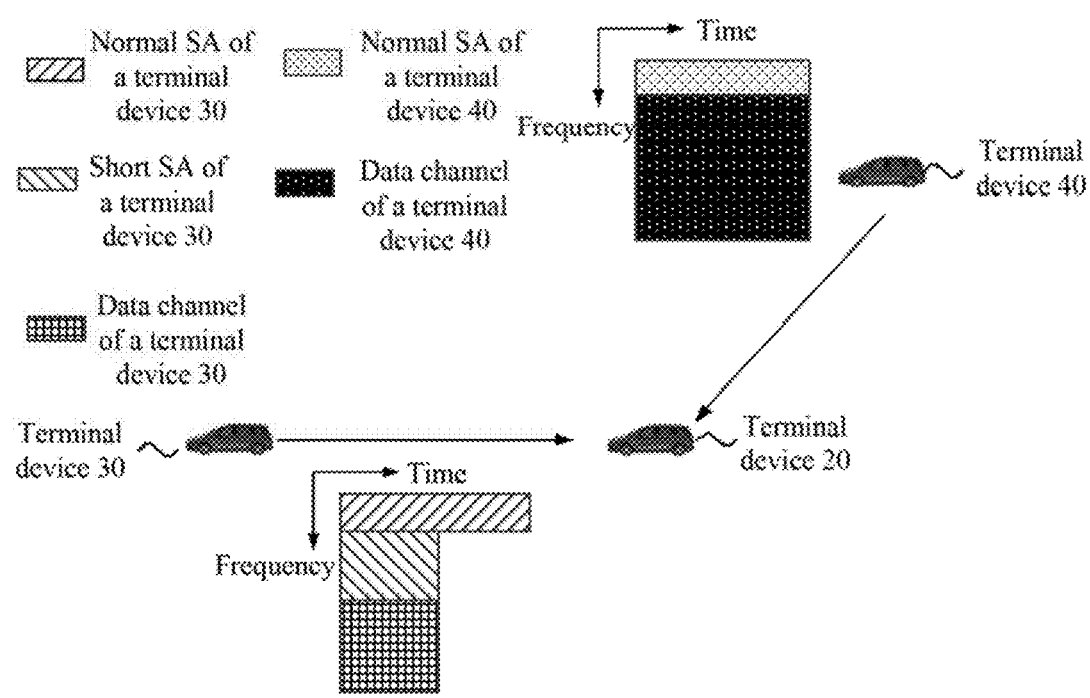
FIG. 3 is a schematic diagram of a resource used by a terminal device for transmitting a control channel and a data channel.

For example, as shown in FIG. 3, it is assumed that the terminal device 20 and the terminal device 30 are terminal devices of Release-15, and the terminal device 40 is a terminal device of Release-14. Upon receiving an SA transmitted by the terminal device 30, the terminal device 20 determines resource occupancy of a data channel of the terminal device 30 according to the content of a short SA, instead of determining the resource occupancy of the data channel of the terminal device 30 according to the content of the received SA. Upon receiving an SA transmitted by the terminal device 40, the terminal device may determine resource occupancy of a data channel of the terminal device 40 directly according to the content of the SA. However, when the terminal device 20 receives a certain SA, it cannot distinguish whether the SA is transmuted by the terminal device 30 or the terminal device 40, and thus it is impossible to determine whether a data channel resource should be determined according to the received SA.

Therefore, in the embodiment of the present disclosure, the terminal device determines resource occupancy of a data channel corresponding to a control channel by using information indicated in a specific bit in the control channel, so that the terminal device can effectively perform resource sensing according to the detected control channel.

It should be understood that, in the embodiment of the present disclosure, a terminal device that supports a communication protocol of Release-14 and does not support Release-15 is simply referred to as a terminal device of Release-14, and the terminal device that supports a communication protocol of Release-15 is simply referred to as a terminal device of Release-15. The terminal device of Release-15 may include a terminal device supporting Release-15 or a terminal device supporting other versions of Release-15, for example, a terminal device supporting Release 16 of Release-15.

Figure 4:
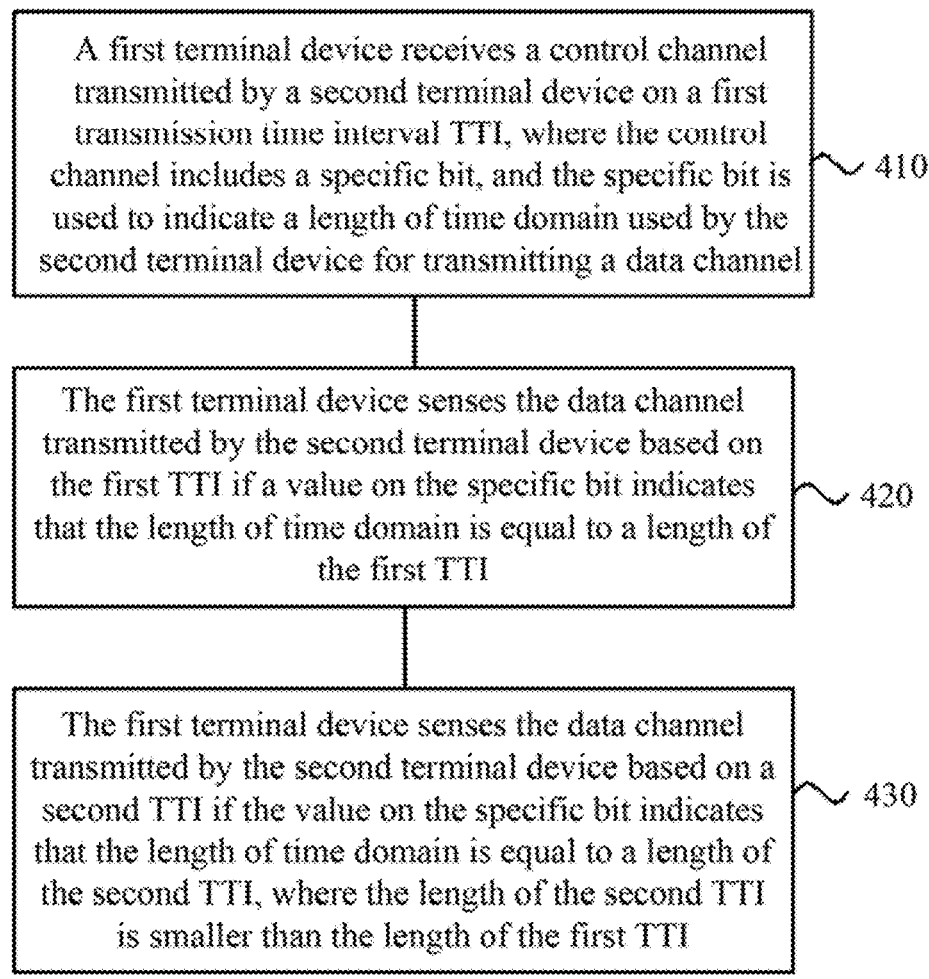
FIG. 4 is a schematic flowchart of a D2D communication method according to an embodiment of the present disclosure.

FIG. 4 is a schematic flowchart of a D2D communication method according to an embodiment of the present disclosure. The method shown in FIG. 4 can be performed by a first terminal device, which can be, for example, the terminal device 20 shown art FIG. 1, where a second terminal device can be, for example, the terminal device 30 or the terminal device shown in FIG. 1. As shown in FIG. 4, the D2D communication method includes:

In 410, the first terminal device receives a control channel transmitted by a second terminal device on a first TTI.

The control channel includes a specific bit, and the specific bit is used to indicate a length of time domain used by the second terminal device for transmitting a data channel.

Specifically, the first terminal device receives, according to the first TTI, the control channel transmitted by the second terminal device, where the control channel can carry, for example, SCI, the SCI can include the specific bit, and the specific bit can be used to indicate the length of time domain used by the second terminal device for transmitting the data channel. The first terminal device may determine, according to a value on the specific bit, whether the length of time domain used by the second terminal device for transmitting the data channel is the length of the first TTI or the length of a second TTI, so as to sense the data channel transmitted by the second terminal device according to the length of a corresponding TTI.

For example, a mapping relationship between a specific bit and a length of time domain of a data channel is shown in Table 1. If a value on the specific bit is 0, it indicates that the length of time domain used by the second terminal device for transmitting the data channel is equal to the length of the first TTI, that is, the length of the time domain of the data channel corresponding to the control channel is the length of the first TTI. In this case, the second terminal device may be, for example, the terminal device 40 that supports Release-14 of the 3GPP protocol shown in FIG. 3. If the value on the specific bit is 1, it indicates that the length of time domain used by the second terminal device for transmitting the data channel is equal to the length of the second TTI, that is, the length of time domain of the data channel corresponding to the control channel is the length of the second TTI. In this case, the second terminal device may be, for example, the terminal device 30 that supports Release-15 of the 3GPP protocol shown in FIG. 3. The length of the second TTI is smaller than the length of the first TTI. For example, the first TTI is equal to one subframe, that is, 1 ms, and the second TTI is equal to one slot, that is, 0.5 ms.

TABLE I

| Specific bit | Time length of the data channel |
|---|---|
| 0 | First TTI |
| 1 | Second TTI |

If the value on the specific bit indicates that the length of time domain used by the second terminal device for transmitting the data channel is equal to the length of the first TTI, the first terminal device performs 420; if the value on the specific bit indicates that the length of time domain used by the second terminal device for transmitting the data channel is equal to the length of the second TTI, the first terminal device performs 430.

In 420, the first terminal device senses the data channel transmitted by the second terminal device based on the first TTI if a value on the specific bit indicates that the length of time domain is equal to a length of the first TTI.

In 430, the first terminal device senses the data channel transmitted by the second terminal device based on a second TTI if the value on the specific bit indicates that the length of time domain is equal to a length of the second TTI, where the length of the second TTI is smaller than the length of the first TTI.

Therefore, the first terminal device determines, by using information indicated by the specific bit in a detected control channel, resource occupancy of the data channel corresponding to the control channel, so that the first terminal device can perform resource sensing effectively according to the detected control channel.

In an implementation, the control channel carries sidelink control information SCI, and the specific bit includes a reserved bit included in the SCI.

In an implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

Figure 5:
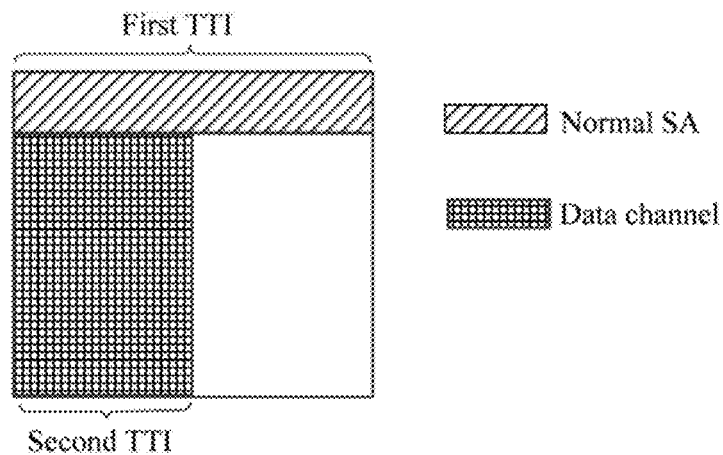
FIG. 5 is a schematic diagram of a first TTI and a second TTI according to an embodiment of the present disclosure.

That is to say, the specific bit in the control channel may not only indicate whether the length of time domain used by the second terminal device for transmitting the data channel is the length of the first TTI or the length of the second TTI, but also the relative position of the second TTI. For example, as shown in FIG. 5, if the length of the first TTI is a length of one subframe, that is, 1 ms, and the length of the second TTI is a length of a time slot, that is, 0.5 ms, then the first TTI corresponds to two of the second TTIs. As shown in FIG. 5, the second terminal device transmits its data channel based can the second TTI, and the second TTI occupied by the data channel is a former TTI in the first TTI corresponding to the second TTI (i.e., the first of the second TTIs). Then, the second terminal device can set the value on the specific bit of the control channel transmitted by itself to 01 according to a mapping relationship between the specific bit and the length of time domain shown in Table 2. After the control channel is detected, the first terminal device can determine, according to the value on the specific bit, that the second terminal device transmits data on the former second TTI of each first TTI, and senses data channel of the second terminal device based on the second TTI.

TABLE 2

| Specific bit | Time length of the data channel |
|---|---|
| 00 | First TTI |
| 01 | The first of the second TTIs |
| 10 | The second of the second TTIs |

It should be understood that the first TTI shown in FIG. 5 includes two second TTIs, and the two second TTIs are equal in length (all equal to the length of one slot). However, in the embodiment of the present disclosure, lengths of a plurality of second TTIs corresponding to the first TTI may be the same or different. For example, the first TTI corresponds to 4 second TTIs, and the lengths of the 4 second TTIs are equal to the length of 4 time domain symbols, 3 time domain symbols, 3 time domain symbols, and 4 time domain symbols, respectively.

It should also be understood that when the second terminal device is the terminal device 30 in FIG. 3, the data channel to be transmitted may be a data channel transmitted based on the second TTI as shown in FIG. 5, of course, the terminal device 30 may also transmit the data channel based on the first TTI, which is not limited in the embodiment of the present disclosure. If the terminal device 30 can transmit data based on the first TTI or the second TTI, a value on the specific bit of the control channel transmitted by the terminal device 30 can be set to a value indicating the length of the first TTI, and can also be set to a value indicating the length of the second TTI.

When the second terminal device is the terminal device 40 in FIG. 3, the data channel is transmitted based on the first TTI, and a value on the specific bit of the control channel transmitted by the terminal device 40 is a value indicating the length of the first TTI.

That is, if the first terminal device supports a communication protocol of Release-15, and the second terminal device supports a communication protocol of Release-14 and does not support the communication protocol of Release-15, the value on the specific bit indicates that the length of time domain is the length of the first TTI; or if the first terminal device supports a communication protocol of Release-15 and the second terminal device supports the communication protocol of Release-15, the value on the specific bit indicates that the length of time domain is the length of the first TTI or the length of the second TTI.

FIG. 6 is a schematic flowchart of a D2D communication method according to an embodiment of the present disclosure. The method shown in FIG. 6 can be performed by a second terminal device, which can be, for example, the terminal device 30 or the terminal device 40 shown in FIG. 1. As shown in FIG. 6, the D2D communication method includes:

In 610, the second terminal device transmits a control channel to a first terminal device based on a first transmission time interval TTI, where the control channel includes a specific bit, and the specific bit is used to indicate that a length of time domain used by the second terminal device for transmitting a data channel is a length of a second TTI, and the length of the second TTI is smaller than a length of the first TTI.

In 620, the second terminal device transmits the data channel to the first terminal device based on the second TTI, so that the first terminal device determines, according to a value on the specific bit, that the length of time domain used by the second terminal device for transmitting, the data channel is the length of the second TTI, and senses the data channel transmitted by the second terminal device based on the second TTI.

Therefore, the second terminal device indicates, by setting a specific bit of a control channel to be transmitted, resource occupancy of the data channel corresponding to the control channel, so that the first terminal device that detects the control channel can perform resource sensing effectively according to the detected control channel.

In an implementation, the method further includes: the second terminal device determines that the length of time domain for transmitting the data channel is the length of the second TTI; and the second terminal device sets the value on the specific bit to a value corresponding to the length of the second TTI according to the length of the second TTI.

For example, when the second terminal device is the terminal device 30 in FIG. 3, if the terminal device 30 can transmit data based on the first TTI and can also transmit data based on the second TTI, a value on the specific bit of the control channel transmitted by the terminal device 30 can be set to a value indicating the length of the first TTI, and can also be set to a value indicating the length of the second TTI. The second terminal device may specifically determine the value on the specific bit according to the mapping relationship shown in Table 1. When the second terminal device is the terminal device 40 in FIG. 3, a data channel is transmitted based on the first TTI, and a value on the specific bit of a control channel transmitted by the terminal device 40 is a value indicating the length of the first TTI.

In an implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

For example, the second terminal device may determine the value on the specific bit according to the relative position of the second TTI for transmitting the data channel in the corresponding first in combination with the mapping relationship shown in Table 2.

In an implementation, where the plurality of second TTIs have the same length or different lengths.

In an implementation, the length of the second TTI is equal to one time slot.

In an implementation, the control channel carries sidelink control information SCI, and the specific bit includes a reserved bit included in the SCI.

In an implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length, of time domain is the length of the first TTI or the length or the second TTI.

It should be understood that specific description of the specific bit of the control channel of the second terminal device may refer to the foregoing description of the first terminal device in FIG. 3 to FIG. 5 and Tables 1 and 2, details are not repeated herein for the sake of clarity.

It should also be understood that, in various embodiments of the present disclosure, the order of sequence numbers in the above processes does not mean the order of execution, and the order of execution of each process should be determined by its functional and internal logic, which shall not be construed as a limit to the implementation process of the embodiment of the present disclosure.

The D2D communication method according to an embodiment of the present disclosure is described in detail above. Hereinafter, an apparatus according to an embodiment of the present disclosure will be described with reference to FIG. 7 to FIG. 11. The technical features described in the method embodiment are applicable to the following apparatus embodiments.

FIG. 7 is a schematic block diagram of a terminal device 700 according to an embodiment of the present disclosure. As shown in FIG. 7, the terminal device is a first terminal device, and the first terminal device 700 includes a transceiving unit 710 and a sensing unit 720. Where:

the transceiving unit 710 is configured to receive a control channel transmitted by a second terminal device on a first transmission time interval TTI, where the control channel includes a specific bit, and the specific bit is used to indicate a length of time domain used by the second terminal device for transmitting a data channel;

the sensing unit 720 is configured to sense the data channel transmitted by the second terminal device based on the first TTI if a value on the specific bit indicates that the length of time domain is equal to a length of the first TTI; and the sensing unit 720 is further configured to sense the data channel transmitted by the second terminal device based on a second TTI if the value on the specific bit indicates that the length of time domain is equal to a length of the second TTI, where the length of the second TTI is smaller than the length of the first TTI.

Therefore, the first terminal device determines, by using information indicated by the specific bit in a detected control channel, resource occupancy of the data channel corresponding, to the control channel, so that the first terminal device can perform resource sensing effectively according to the detected control channel.

In an implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

In an implementation, the plurality of second TTIs have a same length or different lengths.

In an implementation, the length of the second TTI is equal to one time slot.

In an implementation, the control channel carries sidelink control information SCI, and the specific bit includes a reserved bit included in the SCI.

In an implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

Figure 8:
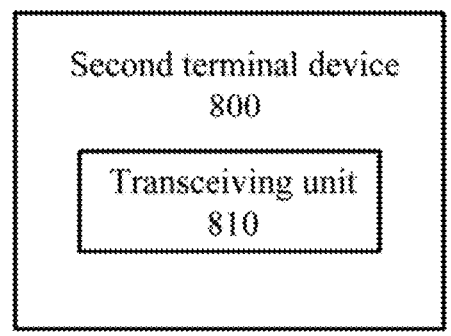
FIG. 8 is a schematic block diagram of a second terminal device according to an embodiment of the present disclosure.

FIG. 8 is a schematic block diagram of a terminal device 800 according to an embodiment of the present disclosure. As shown in FIG. 8, the terminal device is a second terminal device, and the second terminal device 800 includes a transceiving unit 810. The transceiving unit 810 is configured to:

transmit a control channel to a first terminal device based on a first transmission time interval TTI, where the control channel includes a specific bit, and the specific bit is used to indicate that a length of time domain used by the second terminal device for transmitting a data channel is a length of a second TTI, and the length of the second TTI is smaller than a length of the first TTI; and transmit the data channel to the first terminal device based on the second TTI, so that the first terminal device determines, according to a value on the specific bit, that the length of time domain used by the second terminal device for transmitting the data channel is the length of the second TTI, and senses the data channel transmitted by the second terminal device based on the second TTI.

Therefore, the second terminal device indicates, by setting a specific bit of a control channel to be transmitted, resource occupancy of the data channel corresponding to the control channel, so that the first terminal device that detects the control channel can perform resource sensing effectively according to the detected control channel.

In an implementation, the terminal device further includes: a determining unit, configured to determine that the length of time domain for transmitting the data channel is the length of the second TTI; and a processing unit, configured to set the value on the specific bit to a value corresponding to the length of the second TTI according to the length of the second TTI.

In an implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

In an implementation, the plurality of second TTI have a same length or different lengths.

In an implementation, the length of the second TTI is equal to one time slot.

In an implementation, the control channel carries sidelink control information SCI, and the specific bit includes a reserved bit included in the SCI.

In an implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

Figure 9:
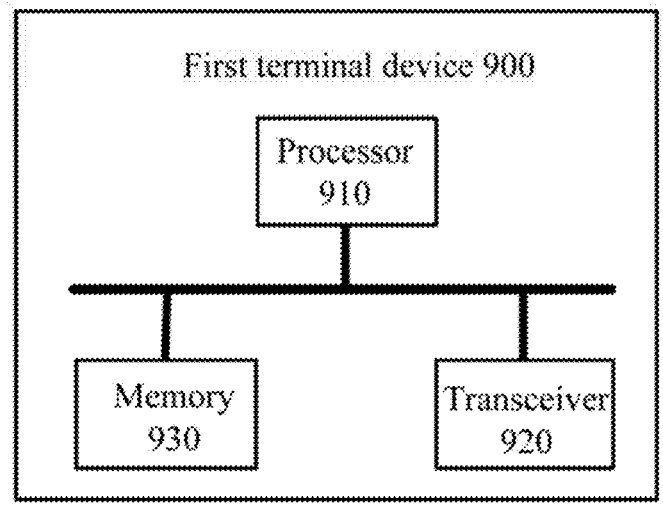
FIG. 9 is a schematic structural diagram of a first terminal device according to an embodiment of the present disclosure.

FIG. 9 is a schematic structural diagram of a terminal device 900 according to an embodiment of the present disclosure. As shown in FIG. 9, the terminal device is a first terminal device, and the first terminal device includes a processor 910, a transceiver 920, and a memory 930, where the processor 910, the transceiver 920, and the memory 930 communicate with each other via an internally connected path. The memory 930 is configured to store instructions, and the processor 910 is configured to execute the instructions stored in the memory 930 to control the transceiver 920 to receive a signal or transmit a signal. The transceiver 920 is configured to:

receive a control channel transmitted by a second terminal device on a first transmission time interval TTI, where the control channel includes a specific bit, and the specific bit is used to indicate a length of time domain used by the second terminal device for transmitting a data channel:

the processor 910 is configured to: sense the data channel transmitted by the second terminal device based on the first TTI if a value on the specific bit indicates that the length of time domain is equal to a length of the first TTI; and sense the data channel transmitted by the second terminal device based on a second TTI if the value on the specific bit indicates that the length of time domain is equal to a length of the second TTI, where the length of the second TTI is smaller than the length of the first TTI.

Therefore, the first terminal device determines, by using information indicated by the specific bit in a detected control channel, resource occupancy of the data channel corresponding to the control channel, so that the first terminal device can perform resource sensing effectively according to the detected control channel.

In an implementation, the first TTI includes a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

In an implementation, the plurality of second TTIs have a same length or different lengths.

In an implementation, the length of the second TTI is equal to one time slot.

In an implementation, the control channel carries sidelink control information SCI, and the specific bit includes a reserved bit included in the SCI.

In an implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

It should be understood that, in the embodiment of the present disclosure, the processor 910 may be a central processing unit (CPU), and the processor 910 may also be other general-purpose processors, a digital signal processor (DSP), an application specific integrated circuit (ASIC), a field programmable gate array (FPGA) or other programmable logic devices, a discrete gate or a transistor logic device, a discrete hardware component, and the like. The general-purpose processor may be a microprocessor or any conventional processor or the like.

The memory 930 can include a read only memory and a random access memory, and provides instructions and data to the processor 910. A portion of the memory 930 may also include a non-volatile random access memory.

In the implementation process, each step of the foregoing method may be implemented by an integrated logic circuit of hardware in the processor 910 or an instruction in a form of software. The steps of the D2D communication method disclosed in the embodiment of the present disclosure may be directly implemented by a hardware processor, or may be performed by a combination of hardware and software modules in the processor 910. The software module can be located in a conventional storage medium such as a random access memory, a flash memory, a read only memory, a programmable read only memory or an electrically erasable programmable memory, a register, and the like. The storage medium is located in the memory 930, the processor 910 reads information in the memory 930 and implements the steps of the above method in combination with its hardware. Details are not described herein to avoid redundancy.

The terminal device 900 according to the embodiment of the present disclosure may correspond to the first terminal device for performing the method 400 in the foregoing method 400, and to the terminal device 700 according to the embodiment of the present disclosure, where the units or modules in the terminal device 900 are respectively configured to perform operations or processes performed by the first terminal device in the above method 400. Details are not described herein to avoid redundancy.

Figure 10:
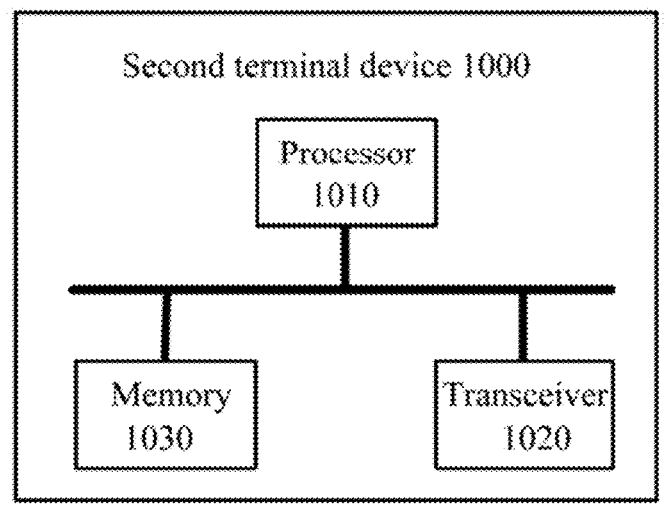
FIG. 10 is a schematic structural diagram of a second terminal device according to an embodiment of the present disclosure.

FIG. 10 is a schematic structural diagram of a terminal device 1000 according to an embodiment of the present disclosure. As shown in FIG. 10, the terminal device is a second terminal device, where the second terminal device includes a processor 1010, a transceiver 1020, and a memory 1030, where the processor 1010, the transceiver 1020, and the memory 1030 communicate with each other via an internally connected path. The memory 1030 is configured to store instructions, the processor 1010 is configured to execute the instructions stored in the memory 1030 to control the transceiver 1020 to receive a signal or transmit a signal. Transceiver 1020 is configured to:

transmit a control channel to a first terminal device based on a first transmission time interval TTI, where the control channel includes a specific bit, and the specific bit is used to indicate that a length of time domain used by the second terminal device for transmitting a data channel is a length of a second TTI, and the length of the second TTI is smaller than a length of the first TTI; and transmit the data channel to the first terminal device based on the second TTI, so that the first terminal device determines, according to a value on the specific bit, that the length of time domain used by the second terminal device for transmitting the data channel is the length of the second TTI, and senses the data channel transmitted by the second terminal device based on the second TTI.

Therefore, the second terminal device indicates, by setting a specific bit of a control channel to be transmitted, resource occupancy of the data channel corresponding to the control channel, so that the first terminal device that detects the control channel can perform resource sensing effectively according to the detected control channel.

In an implementation, the processor 1010 is configured to determine that the length of time domain for transmitting the data channel is the length of the second TTI; and set the value on the specific bit to a value corresponding to the length of the second TTI according to the length of the second TTI.

In an implementation, the first TTI includes a plurality of second TTIs, if the value on the specific bit indicates that the length of time domain is equal to the length of the second the value on the specific bit further indicates a relative position of the second TTI used by the second terminal device for transmitting the data channel in the plurality of second TTI.

In an implementation, the plurality of second TTIs have a same length or different lengths.

In an implementation, the length of the second TTI is equal to one time slot.

In an implementation, the control channel carries sidelink control information SCI, and the specific bit includes a reserved bit included in the SCI.

In an implementation, the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first or the length of the second TTI.

It should be understood that, in the embodiment of the present disclosure, the processor 1010 may be a CPU, and the processor 1010 may also be other general-purpose processors, a DSP, an ASIC, a FPGA or other programmable logic device, a discrete gate or a transistor logic device, a discrete hardware component, and the like. The general-purpose processor may be a microprocessor or any conventional processor or the like.

The memory 1030 can include read only memory and random access memory, and provides instructions and data to the processor 1010. A portion of the memory 1030 may also include a non-volatile random access memory. In the implementation process, each step of the foregoing method may be implemented by an integrated logic circuit of hardware in the processor 1010 or an instruction in a form of software. The steps of the D2D communication method disclosed in the embodiment of the present disclosure may be directly implemented by a hardware processor, or may be performed by a combination of hardware and software modules in the processor 1010. The software module can be located in a conventional storage medium such as a random access memory, a flash memory, a read only memory, a programmable read only memory or an electrically erasable programmable memory, a register, and the like. The storage medium is located in the memory 1030, the processor 1010 reads information in the memory 1030 and implements the steps of the above method in combination with its hardware. Details are not described herein to avoid redundancy.

The terminal device 1000 according to the embodiment of the present disclosure may correspond to the first terminal device for performing the method 600 in the foregoing method 600, and to the terminal device 800 according to the embodiment of the present disclosure, where the units or modules in the terminal device 1000 are respectively configured to perform operations or processes performed by the first terminal device in the above method 600. Details are not described herein to avoid redundancy.

Figure 11:
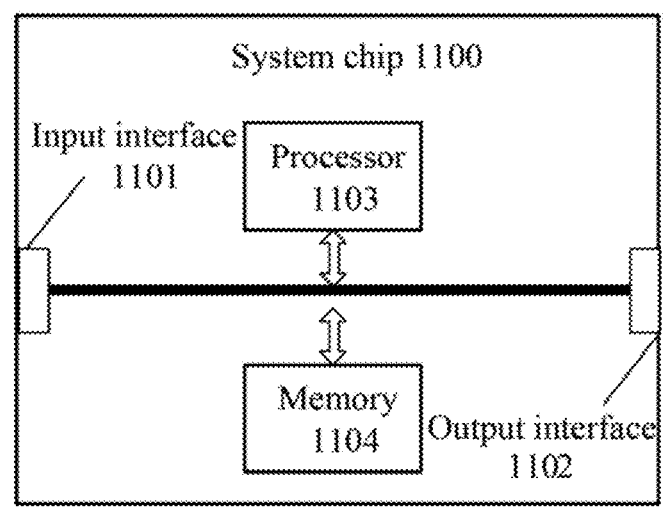
FIG. 11 is a schematic structural diagram of a system chip according to an embodiment of the present disclosure.

FIG. 11 is a schematic structural diagram of a system chip according to an embodiment of the present disclosure. The system chip 1100 of FIG. 11 includes an input interface 1101, an output interface 1102, at least one processor 1103, and a memory 1104, where the input interface 1101, the output interface 1102, the processor 1103, and the memory 1104 are connected via an internally connected path. The processor 1103 is configured to execute a code in the memory 1104.

In an implementation, when the code is executed, the processor 1103 implements a method performed by a terminal device according to the method embodiment 400. For the sake of brevity, details are not described herein again.

In an implementation, when the code is executed, the processor 1103 implements a method performed by a terminal device according to the method embodiment 600. For the sake of brevity, details are not described herein again.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical scheme. Professionals can use different methods for each specific application to implement the described functionality, but this kind of implementation should not be considered beyond the scope of the present disclosure.

A person skilled in the art can clearly understand that for the convenience and brevity of the description, specific working processes of a system, a device and a unit described above can refer to the corresponding processes in the foregoing method embodiments, and details are nut described herein again.

In the several embodiments provided by the present disclosure, it should be understood that the disclosed system, device, and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present disclosure may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present disclosure, in nature, or which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present disclosure. The foregoing storage medium includes: a USB flash disk, a mobile hard disk, a read-only memory (ROM), a random access memory (RAM), a magnetic disk or an optical disk, and the like which can store program codes.

The foregoing description is only specific embodiments of the present disclosure; however, the scope of protection of the embodiments of the present disclosure is not limited thereto, and changes or substitutions that can be readily think of by any person skilled in the art within the technical scope disclosed in the embodiments of the present disclosure shall be covered by the scope of protection of the embodiments of the present disclosure. Therefore, the scope of protection of the present disclosure shall be subject to the scope of protection of the claims.

What is claimed is:

1. A device to device (D2D) communication method, comprising:
    receiving, by a first terminal device, a control channel transmitted by a second terminal device on a first transmission time interval (TTI), wherein the control channel comprises a specific bit, and the specific bit is used to indicate a length of time domain used by the second terminal device for transmitting a data channel;
    sensing, by the first terminal device, the data channel transmitted by the second terminal device based on the first TTI if a value on the specific bit indicates that the length of time domain is equal to a length of the first TTI; and
    sensing, by the first terminal device, the data channel transmitted by the second terminal device based on a second TTI if the value on the specific bit indicates that the length of time domain is equal to a length of the second TTI, wherein the length of the second TTI is smaller than the length of the first TTI;
    wherein the first TTI comprises a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

2. The method according to claim 1, wherein the plurality of second TTIs have a same length or different lengths.

3. The method according to claim 1, wherein the length of the second TTI is equal to one time slot.

4. The method according to claim 1, wherein the control channel carries sidelink control information (SCI), and the specific bit comprises a reserved bit comprised in the SCI.

5. The method according to claim 1, wherein the first terminal device supports a communication protocol of Release-15, the second terminal device supports a communication protocol of Release-14 and does not support the communication protocol of Release-15, and the value on the specific bit indicates that the length of time domain is the length of the first TTI; or
    the first terminal device supports a communication protocol of Release-15, the second terminal device supports the communication protocol of Release-15, and the value on the specific bit indicates that the length of time domain is the length of the first TTI or the length of the second TTI.

6. A terminal device, wherein the terminal device is a first terminal device, and the first terminal device comprises a processor, a transceiver and a memory, the memory is configured to store instructions, the processor is configured to execute the instructions stored in the memory to control the transceiver to receive a signal or transmit a signal, wherein:
    the transceiver is configured to receive a control channel transmitted by a second terminal device on a first transmission time interval (TTI), wherein the control channel comprises a specific bit, and the specific bit is used to indicate a length of time domain used by the second terminal device for transmitting a data channel;
    the processor is configured to sense the data channel transmitted by the second terminal device based on the first TTI if a value on the specific bit indicates that the length of time domain is equal to a length of the first TTI; and the processor is further configured to sense the data channel transmitted by the second terminal device based on a second TTI if the value on the specific bit indicates that the length of time domain is equal to a length of the second TTI, wherein the length of the second TTI is smaller than the length of the first TTI;

wherein the first TTI comprises a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

7. The terminal device according to claim 6, wherein the plurality of second TTIs have a same length or different lengths.

8. The terminal device according to claim 6, wherein the length of the second TTI is equal to one time slot.

9. The terminal device according to claim 6, wherein the control channel carries sidelink control information (SCI), and the specific bit comprises a reserved bit comprised in the SCI.

10. The terminal device according to claim 6, wherein the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

11. A terminal device, wherein the terminal device is a second terminal device, and the second terminal device comprises a processor, a transceiver and a memory, the memory is configured to store instructions, the processor is configured to execute the instructions stored in the memory to control the transceiver to receive a signal or transmit a signal, wherein:

the transceiver is configured to transmit a control channel to a first terminal device based on a first transmission time interval (TTI), wherein the control channel comprises a specific bit, and the specific bit is used to indicate that a length of time domain used by the second terminal device for transmitting a data channel is a length of a second TTI, and the length of the second TTI is smaller than a length of the first TTI; and the transceiver is further configured to transmit the data channel to the first terminal device based on the second TTI, so that the first terminal device determines, according to a value on the specific bit, that the length of time domain used by the second terminal device for transmitting the data channel is the length of the second TTI, and senses the data channel transmitted by the second terminal device based on the second TTI;

wherein the first TTI comprises a plurality of second TTIs, if the value on the specific bit indicates that the length of time domain is equal to the length of the second TTI, the value on the specific bit further indicates a relative position of the second TTI used by the second terminal device for transmitting the data channel in the plurality of second TTIs.

12. The terminal device according to claim 11, wherein the processor is further configured to:

determine that the length of time domain for transmitting the data channel is the length of the second TTI; and set the value on the specific bit to a value corresponding to the length of the second TTI according to the length of the second TTI.

13. The terminal device according to claim 12, wherein the plurality of second TTIs have a same length or different lengths.

14. The terminal device according to claim 11, wherein the length of the second TTI is equal to one time slot.

15. The terminal device according to claim 11, wherein the control channel carries sidelink control information (SCI), and the specific bit comprises a reserved bit comprised in the SCI.

16. The terminal device according to claim 11, wherein the first terminal device supports a communication protocol of Release-15, the second terminal device supports a communication protocol of Release-14 and does not support the communication protocol of Release-15, and the value on the specific bit indicates that the length of time domain is the length of the first TTI; or the first terminal device supports a communication protocol of Release-15, the second terminal device supports the communication protocol of Release-15, and the value on the specific bit indicates that the length of time domain is the length of the first TTI or the length of the second TTI.

* * * * *